Nov. 25, 1952 V. A. SANDER 2,619,565
CURRENT LIMITER
Original Filed Nov. 28, 1949

Vernon A. Sander,
Inventor,
Haynes and Koenig,
Attorneys.

Patented Nov. 25, 1952

2,619,565

UNITED STATES PATENT OFFICE 2,619,565

CURRENT LIMITER

Vernon A. Sander, St. Louis, Mo., assignor to W. N. Matthews Corporation, St. Louis, Mo., a corporation of Missouri Original application November 28, 1949, Serial No. 129,810, now Patent No. 2,565,631, dated August 28, 1951. Divided and this application February 20, 1950, Serial No. 145,227

13 Claims. (Cl. 200—113)

This invention relates to current limiters and more particularly to thermostatic current limiters for use in a power distribution system to limit the amount of current drawn by an individual consumer.

This application is a division of my copending application Serial No. 129,810, filed November 28, 1949, which has resulted in Patent No. 2,565,631, dated August 28, 1951.

This invention is an improvement upon the current limiter disclosed in the patent of Carl E. Mosley, No. 2,518,361, issued August 8, 1950 and its division, Serial No. 129,775, filed November 28, 1949.

The object of the invention is the provision of an improved, simplified, reliable current limiter of the general type shown in the above-identified Mosley patent and application which is particularly adapted for use in three-wire distribution systems for limiting the amount of current drawn by an individual consumer, i. e., to impose a peak limit upon the current which a consumer may use. The current limiter is particularly useful for automatically disconnecting a secondary or dispensable load element, such as an electric water heater, if the total load drawn by the consumer should exceed the peak limit. A consumer may have, for example, primary load elements such as lights, an electric range, and other electric appliances, and a dispensable or secondary load element, such as an electric water heater, all drawing current from a three-wire supply system. With the present invention, the heater, operation of which may be most conveniently discontinued as regards the other load elements, may be connected to draw current at the full voltage across the outer conductors of the system as long as the total load on one leg of the system does not exceed the peak limit, automatically disconnected whenever the total load exceeds the peak limit, and automatically restored to service when the load drops below the peak limit.

In general, a current limiter of this invention comprises a pair of terminal elements, and a generally E-shaped thermostatic device having a pair of outer thermostatic legs adapted to be heated in response to flow of current therethrough and joined at one of their ends by an electrically conductive connecting member, and having a central thermostatic leg which is electrically and thermally insulated from the connecting member extending from the connecting member between the outer legs. The latter are fixed at their other ends to the terminal elements and cantilevered outward from the terminal elements so that the connecting member is free to move as the outer legs flex in response to temperature change. A switch is located adjacent to and is actuated by the free end of the central leg. With this arrangement, the current limiter may be connected in a power consumer's wiring system of this invention supplied by a three-wire single-phase service to disconnect a secondary appliance, such as a water heater, if the current drawn by the consumer exceeds a peak limit, without disconnecting the consumer's more essential primary load elements such as lights and an electric range. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a view in side elevation of a current limiter of this invention;

Similar reference characters indicate corresponding parts throughout the several views of the drawing.

Figure 1:
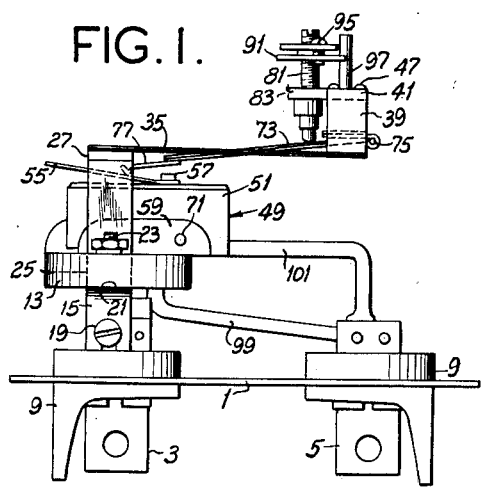
Figure 2:
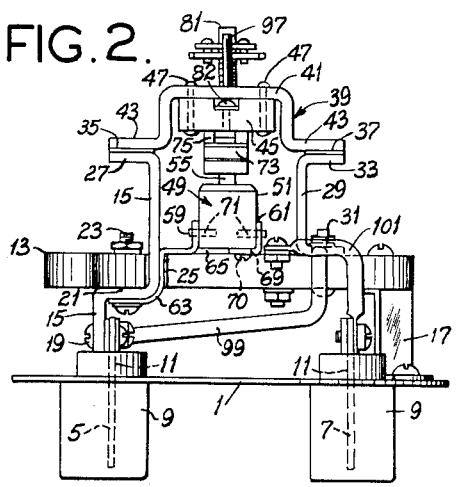
Fig. 2 is an end elevation of Fig. 1 as viewed from the right.

Referring to the drawing, a current limiter of this invention is shown to comprise a base 1 consisting of a circular metal plate. This carries three main terminals 3, 5 and 7. Each of these main terminals is fixed in an insulation bushing 9 secured in an aperture in the plate to insulate the terminals from the plate. Each main terminal, as illustrated consists of a flat metal strip, and each bushing has a narrow rectangular opening 11 receiving its respective strip, with the strips extending above and below the plate. At 13 is shown an insulation panel mounted on and above the base 1 by means of posts 15 and 17. The post 15 is a conductor to serve as a terminal and is bolted to the upper end of the terminal 3 as indicated at 19. The post 15 is formed with a step 21 on which the panel 13 bears, the panel being bolted on the step as indicated at 23. The post 15 extends upward from the step above the panel through a slot 25 in the panel, and is formed with an outwardly projecting ear 27 at its upper end. The post 17 does not carry current.

At 29 is shown a conductive terminal post which extends upward from the panel 13 parallel to the post 15. The post 29 is secured at its lower end to the panel as indicated at 31 and has an outwardly projecting ear 33 at its upper end at the level of the ear 27 on the upper end of the post 15. Current-heated thermostatic blades 35 and 37 of composite thermostat metal are secured at one end upon the ears 27 and 33, respectively, as by welding, and are cantilevered outward in the same direction from the ears in coplanar, laterally spaced, parallel relation. The two blades are of substantially the same length and have substantially the same temperature-displacement characteristics. Each blade is arranged to bend up upon heating, down upon cooling. For example, the blades may be bimetallic with their low coefficient of thermal expansion sides on top.

The free ends of the blades are connected by a relatively thick conductive connecting member or bridge 39. This comprises a rigid bar bent to have a U-shaped central portion 41 with flanges 43 extending outward from the ends of the arms of the U. The flanges 43 are secured to the upper sides of the free ends of the blades as by welding with the U-shaped central portion opening downward. A block of thermal (and electrical) insulation 45 is secured within the U by means of bolts 47. Member 39 is free to move up upon heating of blades 35 and 37, down upon cooling.

A snap-acting switch 49 is mounted on the panel 13 between the posts 15 and 29. This switch is of a type which is conventional in the art, having an insulation case 51 housing the switch contacts and the snap-acting switch-actuating mechanism, and having an operating button 53 (Fig. 4) projecting and biased upward through an opening in the top of the switchcase. It also has a resilient lever 55 fixed at one end to the top of the case as indicated at 57 and extending over the button. The lever 55 is normally raised and may be pushed downward against its inherent bias to push in the button and open the switch, the switch being normally closed. When the lever is raised, the button moves upward and the switch re-closes.

The switch is held upon the panel 13 between conductive switch-holding members 59 and 61 secured to the panel to extend along the sides of the switch case. The member 59 has a portion 63 which reaches through the slot 25 in the panel and which is held in place by the bolt 23 holding the panel on the step 21. This also serves electrically to connect the post 15 and the member 59. The member 59 also has a portion 65 reaching under the switch case which is connected to one terminal 66 of the switch. The member 61 is fastened to the panel at 67 and has a portion 69 reaching under the switch case which is connected to the other terminal 70 of the switch. The switch case is held in place between the members 59 and 61 by means of pins 71 extending from the case through holes in the members.

A thermostatic blade element 73 of composite thermostat metal is pivoted at 75 to the insulation block 45 carried by the member 39 and extends from the pivot under the block and centrally between the blades 35 and 37. The blade 73 carries a finger 77 at its free end which bears on the switch-actuating lever 55. The blade 73 is pivoted at 75 to a hinge leaf 79 fixed to the bottom of the block 45 by a bolt 80, the pivotal axis being transverse to the center line between the blades 35 and 37. The blade 73 is arranged so that its free end carrying finger 77 moves upward on heating, downward on cooling. For example, the blade 73 may be a bimetallic blade with its low coefficient of thermal expansion side on top. As illustrated, the blade 73 is shorter than the blades 35 and 37 but approximately equal to the length of the blades 35 and 37 between the rigid flanges 43 and posts 15 and 29, and it is made thicker than blades 35 and 37.

Figure 4:
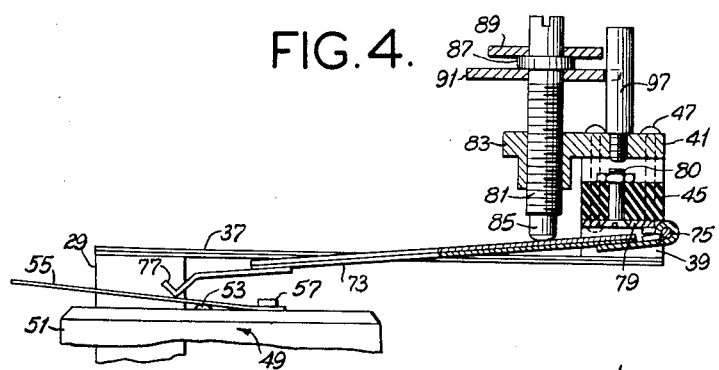
Fig. 4 is an enlarged fragmentary section taken on line 4—4 of Fig. 3.
Figure 3:
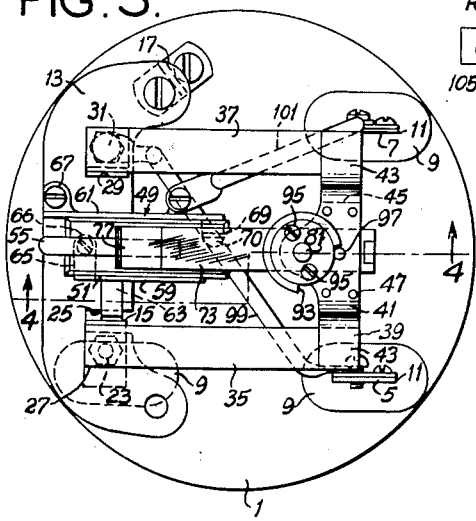
Fig. 3 is a plan view of Fig. 1.

The finger 77 on the free end of the blade 73 is adapted to be maintained in pressure engagement with the operating lever 55 of switch 49 by means of a screw 81 threaded in an ear 83 formed on the member 39, the screw being located between the pivot 75 and the free end of the blade 73 near the pivot. The screw has a tip 85 of thermal insulation bearing against the upper side of the blade 73. Adjacent its upper end, the screw has a flange 87 (Fig. 4). Bearing against the top of this flange is a head 89 and bearing against the bottom of the flange is a stop disc 91 larger than the head having a notch 93 in its periphery (Fig. 3). The head and disc are tied together by screws 95, which releasably clamp them against the flange so that, by loosening the screws 95, the angular position of the head and disc on the screw 91 may be varied. A stop pin 97 extends upward from the member 39 through the notch 93 to limit the rotation of the screw to the arcuate extent of the notch. It will be seen that the pressure of the finger 77 on the lever 55 may be varied by turning the screw 81 to move it up or down.

The main terminal 5 is electrically connected to the terminal post 29 by means of a conductive rod 99. The main terminal 7 is electrically connected to the member 61 by means of a conductive rod 101. The main terminal 3, as previously described, is directly connected to the terminal post 15.

The blades 35 and 37, the connecting member 39 and the blade 73 form a generally E-shaped thermostatic device having its outer current-carrying legs 35 and 37 joined at one of their ends by the electrically conductive connecting member 39 and its central thermostatic leg 73 extending from the connecting member 39 between the outer legs, and thermally insulated from the member 39 by the block 45. The outer legs are fixed at their outer ends to the posts 15 and 29, which form terminal elements, and are cantilevered outward from the terminal posts 15 and 29 so that the connecting member is freely movable in response to temperature change as the outer legs 35 and 37 flex. As herein illustrated in Fig. 4, the connecting member 39 moves up and angles counter-clockwise when legs 35 and 37 are heated and flex. The blade 73 functions as a crank and translates the angling movement of the connecting member 39 to switch-actuating pressure on the lever 55.

Figure 5:
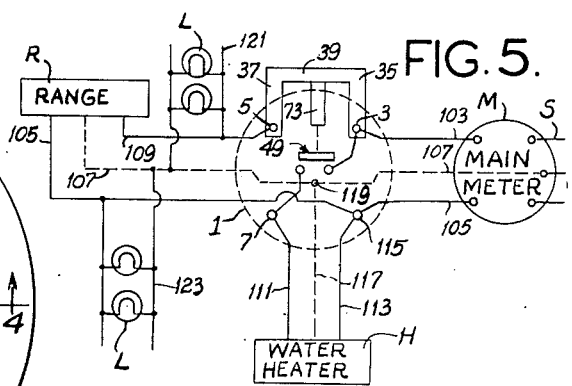
Fig. 5 is a wiring diagram illustrating a mode of connecting the current limiter shown in Figs. 1 to 4 in a consumer's circuit.

Fig. 5 illustrates a circuit arrangement wherein the above-described current limiter is connected in a three-wire single-phase system supplying a consumer's load requirements shown as including an electric range R, an electric water heater H, lights and other load elements L. The supply circuit is shown at S, with the neutral wire of the circuit shown as a dotted line. At M is shown the usual main electric meter, from which lead outer conductors 103 and 105 and a neutral wire 107, the latter being shown as a dotted line. The conductor 103 is connected to the terminal 3 of the current limiter. A conductor 109 is connected to the terminal 5 of the current limiter. The range R is connected across conductors 105 and 109 and grounded by the neutral wire 107. The heater H is connected across conductors 103 and 105 in a circuit including the switch 49 by means of a wire 111 connected to one terminal of the heater and to the terminal 7 of the current limiter and a wire 113 connected to the other terminal of the heater and to the wire 105 at 115. The heater is grounded by a neutral wire 117 connected to the neutral wire 107 at 119. The load elements L are connected in two separate circuits 121 and 123, one being connected across conductor 109 and neutral wire 107 and the other across conductor 105 and neutral wire 107.

In operation, current flows in series through thermostatic element 35, member 39 and thermostatic element 37 of the E-shaped thermostatic device. The thermostatic elements 35 and 37 are thereby heated to a degree dependent upon the current value. The value of the current flowing through the thermostatic device is dependent upon the load imposed by the range R and the load elements L. Whenever the current drawn by the range and load elements L exceeds a predetermined peak value, as determined by the setting of the screw 81, the thermostatic elements 35 and 37 are heated to such an extent that the member 39 angles in one direction and acts through the plate 73 to open the switch 49, thereby disconnecting the water heater H. When the current drops below the peak value, the elements 35 and 37 cool, member 39 angles in the other direction, and permits the switch 49 to re-connect the heater H. The arrangement is such that the customer may, if desired, voluntarily reduce the load imposed by the range R or the load elements L below the peak value to maintain the heater connected.

The peak value may be varied within limits by varying the adjustment of the screw 81. By adjusting the screw downward, thereby increasing the pressure of the finger 77 on the switch lever 55, the peak value may be reduced, and by adjusting the screw upward, the peak value may be raised. Suitable indicia indicating the peak values that may be set may be scribed on the head 89 and read in conjunction with pin 97 as an index.

As shown in Fig. 5, the heater H is connected in the circuit ahead of the current limiter, and the current drawn by the heater has no effect on the current limiter. If desired, the heater H may be connected so that the current drawn thereby flows through the thermostatic device of the current limiter simply by reversing the connections of conductors 103 and 109, i. e., connecting conductor 103 to terminal 5 and connecting conductor 109 to terminal 3.

The central thermostatic leg 73 of the E-shaped thermostatic device does not carry current, being electrically as well as thermally insulated from the member 39 by the insulation block 45. This thermal insulation of the leg 73 from the member 39 is important because it prevents leg 73 from being heated by conduction and changing the operating characteristics. The central leg 73 acts as a switch-operating arm and is made thermostatic to afford ambient temperature compensation by reason of the fact that as member 39 moves in response to ambient temperature changes, the end of the leg 73 moves in such direction as to counteract the movement of the member 39. For example, if the ambient temperature increases and member 39 moves upward in switch-opening direction, the free end of leg 73 moves upward to offset the tendency of member 39 to open the switch. The leg 73 is made thicker than the legs 35 and 37 as it bears a greater mechanical load and its length is made such as to afford the necessary deflection of its free end for ambient temperature compensation. The hinging of the leg 73 to the member 39 is an important feature as it has the advantage of eliminating the effect of any difference between the temperature-displacement characteristics of legs 35 and 37.

In view of the above, it will be seen that the several objects of the invention are achieved and other advantageous results attained.

As many changes could be made in the above construction without departing from the scope of the invention, it is intended that all matter contained in the above description or shown in the accompanying drawing shall be interpreted as illustrative and not in a limiting sense.

I claim:

1. A current limiter comprising a pair of terminal elements, a generally E-shaped thermostatic device having a pair of outer thermostatic legs of composite thermostat metal adapted to be heated in response to flow of current therethrough and joined at one of their ends by an electrically conductive connecting member, and having a central leg which is electrically and thermally insulated from the connecting member extending from the connecting member between the outer legs, the outer legs being fixed at their other ends to the terminal elements and cantilevered outward therefrom so that the connecting member is free to move as the outer legs flex in response to temperature change, and a switch located adjacent to and actuated by the free end of the central leg, said central leg comprising a thermostatic element of composite thermostat metal arranged for movement of its free end in the same direction as the connecting member in response to ambient temperature change, the connecting member being angled by flexing of said outer legs and the central leg being angled by the connecting member.

2. A current limiter comprising a pair of terminal elements, a generally E-shaped thermostatic device having a pair of outer thermostatic legs of composite thermostat metal adapted to be heated in response to flow of current therethrough and joined at one of their ends by an electrically conductive connecting member, and having a central leg which is electrically and thermally insulated from the connecting member extending from the connecting member between the outer legs, the outer legs being fixed at their other ends to the terminal elements and cantilevered outward therefrom so that the connecting member is free to move as the outer legs flex in response to temperature change, and a snap-acting switch comprising a case housing the switch contacts and having an operating button projecting from the case located for actuation of the button by the free end of the central leg, said central leg comprising a thermostatic element of composite thermostat metal arranged for movement of its free end in the same direction as the connecting member in response to ambient temperature change, the connecting member being angled by flexing of said outer legs and said central leg being angled by the connecting member.

3. A current limiter comprising a support, a pair of rigid terminal posts mounted upon the support, a generally E-shaped thermostatic device having an outer pair of relatively flexible blades each fixed at one end to a terminal post and arranged in generally coplanar laterally spaced parallel relation, a relatively rigid conductive connecting member joining the other and free ends of said blades and providing an electric circuit for electric heating thereof; a normally-closed snap-acting switch mounted upon said support between the terminal posts, said switch having an operating element biased away from the support and movable toward the support to actuate the switch; and a central thermostatic blade attached at one end to the connecting member by means which thermally insulates the central blade from the connecting member, the other end of the central blade bearing against the switch-operating element; the outer blades being formed of composite thermostatic metal arranged so that they flex generally away from the support when heated, thereby angling the central thermostatic blade toward the support to actuate the switch, and the central blade being formed of composite thermostat metal arranged to flex in the same direction as the outer blades in response to ambient temperature changes.

4. A current limiter as set forth in claim 3, wherein the connecting member is arched, and a block of thermal insulation is fixed in the arch of said connecting member, said central thermostatic blade being mounted on the block of thermal insulation so as to extend normally in substantially coplanar relation with the outer thermostatic blades.

5. A current limiter as set forth in claim 4 wherein the central thermostatic blade is mounted upon the block of thermal insulation by means of metal studs and the block is mounted upon the connecting member by other metal studs.

6. A current limiter as set forth in claim 3 wherein the connecting member has an ear extending over the central thermostatic blade, through which is threaded a screw that bears against the central thermostatic blade and which is adjustable for varying the pressure of the central blade on the switch-operating element.

7. A current limiter as set forth in claim 6 wherein the tip of the screw bearing against the central thermostatic blade is formed of thermal insulation.

8. A current limiter comprising an insulation support, a pair of terminal posts on the support, a pair of normally generally flat current-heated thermostatic blades of composite thermostat metal, one fixed at one end to one post and the other fixed at one end to the other post, the blades extending outward from the posts as cantilevers in generally coplanar laterally spaced parallel relation, an electrically conductive bridge joining the free ends of the blades and movable by the blades as the latter flex in response to temperature change, an operating arm extending from the bridge between the first two blades and electrically and thermally insulated from the bridge, said arm comprising a normally generally flat thermostatic blade of composite thermostat metal arranged for movement of its free end in the same direction as the bridge in response to ambient temperature change, a snap-acting switch on the support having a switch-operating element engaged by the free end of the operating arm, and an adjusting member carried by the bridge engaging the arm for causing the arm to bear upon the switch-operating element and adjustable relative to the bridge for varying the pressure of the arm on the switch-operating element.

9. A current limiter as set forth in claim 8 wherein the bridge has a block of thermal insulating material fixed thereto, wherein the operating arm is pivotally connected to said block, and wherein the adjusting member engages one side of the operating arm between its pivotal connection to the block and its free end and the switch-operating element is in engagement with the other side of the arm adjacent its free end.

10. A current limiter as set forth in claim 9 wherein the adjusting member comprises a screw threaded in the bridge and having a thermal insulation tip bearing against the arm.

11. A current limiter as set forth in claim 9 wherein the adjusting member comprises a screw threaded in the bridge and having a thermal insulation tip bearing against the arm, wherein the screw carries a stop disc having a notch in its periphery, and wherein a pin extends from the bridge through the notch.

12. A current limiter comprising an insulation support, a pair of normally generally flat current-heatable thermostatic blades of composite thermostat metal, each fixed at one end to the support and extending as a cantilever from the support with its other end free of the support, the blades being positioned in generally coplanar laterally spaced side-by-side relation and arranged so that both flex in one direction in unison upon increase in temperature and in the opposite direction upon decrease in temperature, an electrically conductive bridge joining the free ends of the blades and movable by the blades as the latter flex in response to temperature change, a third normally generally flat thermostatic blade of composite thermostat metal extending from the bridge between the first two blades and electrically and thermally insulated from the bridge, and arranged to flex in the same manner as the first two blades in response to ambient temperature change, and a switch carried by the support and having a switch-operating element operable by the free end of said third blade.

13. A current limiter as set forth in claim 12 wherein the switch comprises a snap-acting switch comprising a case housing switch contacts and having an operating button projecting from the case and positioned for actuation of the button by the free end of said third blade.

VERNON A. SANDER.

REFERENCES CITED

The following references are of record in the file of this patent:

UNITED STATES PATENTS

| Number | Name | Date |
| --- | --- | --- |
| 1,849,280 | Chandler | Mar. 15, 1932 |
| 2,280,960 | Lee | Apr. 28, 1942 |
| 2,284,644 | Dubilier | June 2, 1942 |
| 2,302,399 | Stimson | Nov. 17, 1942 |
| 2,518,361 | Mosley | Aug. 8, 1950 |